Aug. 12, 1930.  B. N. JONES  1,772,867
BRAKE
Filed March 23, 1926    2 Sheets-Sheet 2

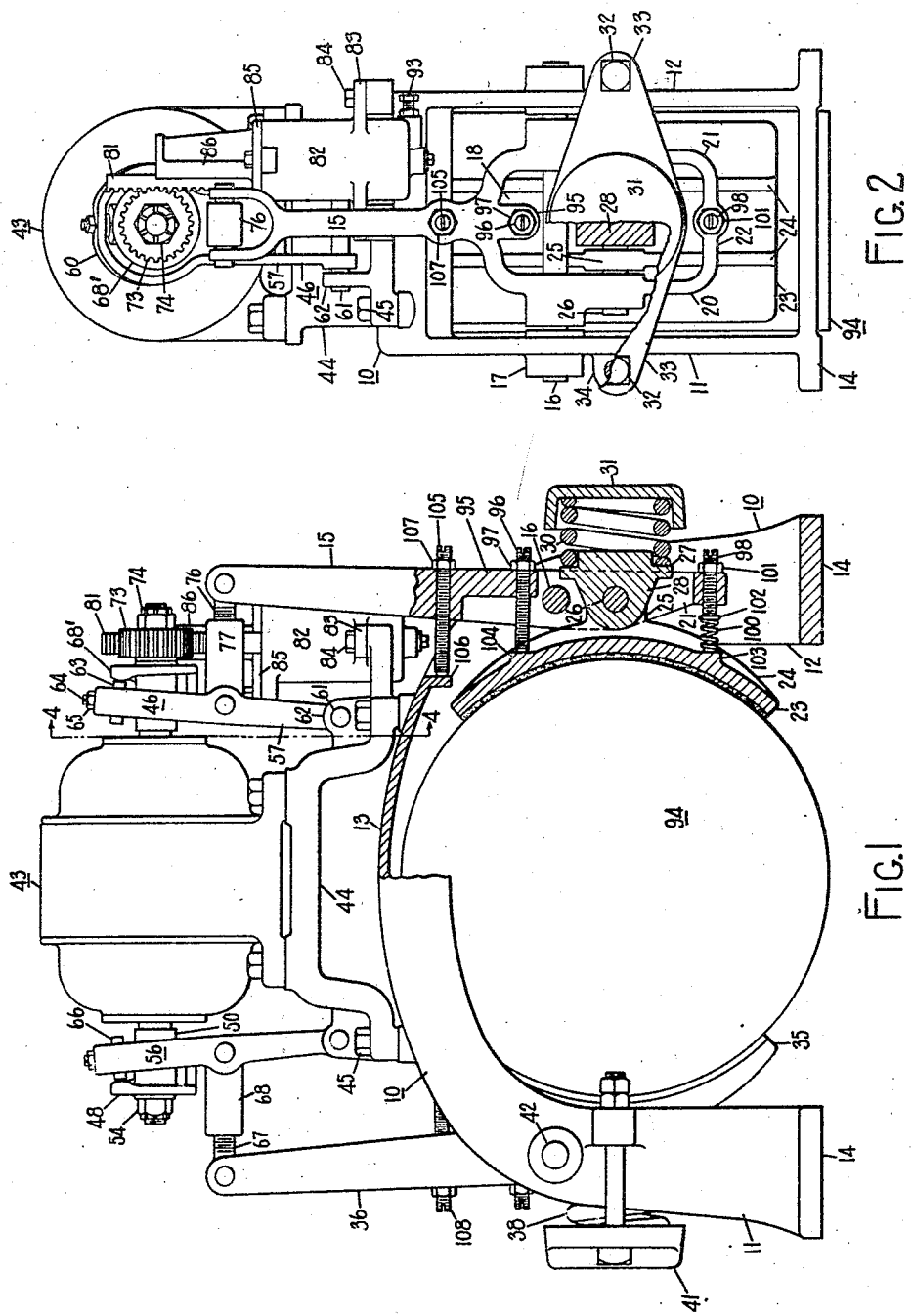

Benjamin N. Jones INVENTOR
BY  _____  ATTORNEY

Patented Aug. 12, 1930

1,772,867

UNITED STATES PATENT OFFICE

BENJAMIN N. JONES, OF GLEN RIDGE, NEW JERSEY, ASSIGNOR TO OTIS ELEVATOR COMPANY, OF JERSEY CITY, NEW JERSEY, A CORPORATION OF NEW JERSEY

BRAKE

Application filed March 23, 1926. Serial No. 96,756.

The invention relates to mechanism of the type wherein friction shoes are caused to engage a rotatable drum and particularly to multiple shoe braking mechanism for elevator hoisting machines wherein the brake shoes are mechanically applied and electrically released.

One feature of the invention is the provision of braking mechanism in which the operation of the brake shoes is caused by rotative means, as by a motor, in a simple and efficient manner.

Another feature is the provision of such braking mechanism in which the proper release and application of the brake shoes is assured under all conditions of operation and in which stresses on the parts of the operating means, such as caused by variations of adjustment or by uneven wear, are eliminated.

Still another feature is the provision of such braking mechanism which is of simple construction, quiet in operation and readily adjustable.

A fourth feature resides in arranging such mechanism so that the force exerted to move one shoe with respect to the drum is counterbalanced by the force exerted to move another shoe with respect to the drum.

Other features and advantages will become apparent from the specification, taken in connection with the accompanying drawings wherein one embodiment of the invention is illustrated.

In the drawings:

Figure 1 is a side elevation of the brake, with portions shown in section to illustrate certain structural features;

Figure 2 is a front elevation of the same, also with portions shown in section;

Figure 4:
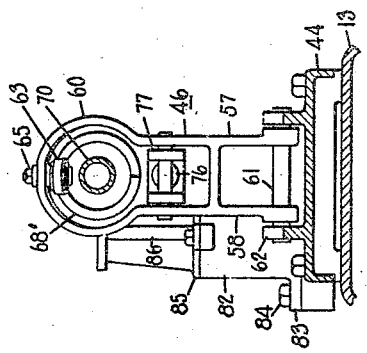
Figure 4 is a section taken along line 4—4 of Figure 1, illustrating the details of a portion of the operating mechanism.

The brake frame 10, upon which the mechanism is supported, consists of two sides 11 and 12 joined at the top by a web 13 and at their bottoms by the feet 14. Considering only the right half of the mechanism as viewed in Figure 1, the operating lever 15 is pivotally mounted on a pin 16, supported as by bosses 17 formed on the sides of the brake frame. The lever is widened at the support and is formed with an opening 18, the sides of the lever which embrace the opening being designated 20 and 21. These two sides are joined at their lower ends by a yoke 22. The brake shoe 23 is provided with strengthening ribs 24 formed with lugs 25 extending into opening 18 between the sides 20 and 21. The brake shoe is pivotally mounted on the lever by means of a pin 26 extending through the sides 20, 21 and lugs 25. A spring seat 27 also is pivotally mounted on lever 15 by pin 26, the seat being formed with a lug 28 which extends between lugs 25 on ribs 24 and through which pin 26 extends. The actuator spring 30 extends outwardly into a spring cap 31. The spring cap is secured to the frame 10, as by means of bolts 32 extending through flanges 33 formed on the spring cap and lugs 34 formed on the sides of the frame, so as to permit the adjustment of the compression of spring 30. Considering the left hand half of the mechanism as viewed in Figure 1, in a similar manner brake shoe 35 is pivotally mounted on lever 36 and is provided with an actuator spring 38 extending between a spring seat and spring cap 41. The lever is pivotally mounted on pin 42 supported by the sides of the brake frame.

Figure 3:
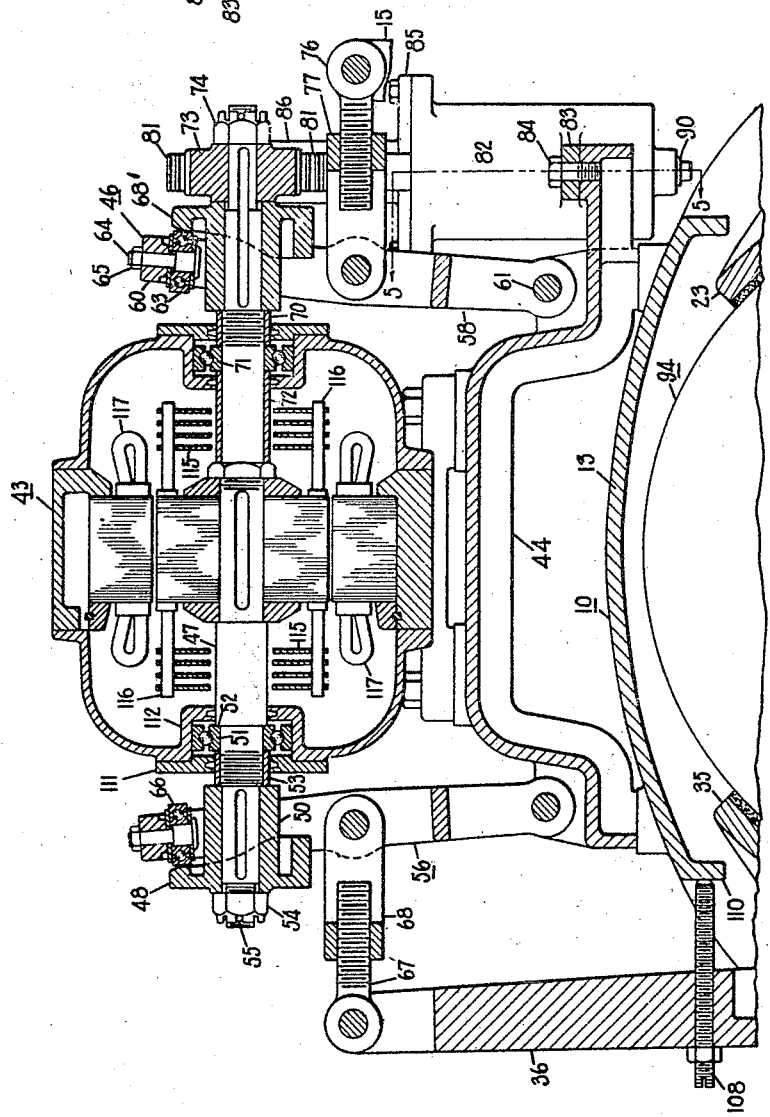
Figure 3 is an enlarged sectional view of the upper portion of Figure 1.

Although any suitable means for producing rotative motion may be employed to cause the action of the mechanism to release the brake shoes, it is preferred to utilize an electric torque motor 43. The motor is mounted on a base 44 secured, as by screws 45, to the top of the brake frame 10. As illustrated for the left half of the mechanism in Figures 1 and 3, the portion of the motor shaft extending outside the motor frame is provided with a cam 48. Referring particularly to Figure 3, the cam is of the cylindrical type and is formed integrally with the sleeve 50. A driving connection between the shaft 47 and the cam is obtained by means of a key and keyway as illustrated. The inner race of motor shaft bearing 51 is positioned against a shoulder 52, formed on the shaft 47, by a threaded spacing sleeve 53. The outer end of the shaft is threaded to receive a nut 54. This nut serves to locate the cam on the shaft with sleeve 50 abutting against spacing sleeve 53. A pin 55 is provided for locking the nut against turning.

The right hand portion of shaft 47 is similarly provided with the cam 68, a threaded spacing sleeve 70 and supporting bearing 71 the inner race of this bearing, however, being arranged between the spacing sleeve and an additional sleeve 72 employed for locating purposes. A pinion 73 is interposed between cam 68 and nut 74. The driving connection between shaft 47 and pinion 73 may be obtained by the same key and keyway employed for the cam 68.

The cam 68, upon being rotated, imparts motion to a roller lever 46. As more clearly shown in Figure 4 for the right hand half of the mechanism, the roller lever 46 is preferably of substantially an inverted U construction having two sides 57 and 58 and a connecting yoke 60. A pin 61, extending through lugs 62 formed on the motor base 44 and the bottom ends of sides 57 and 58, forms a pivotal mounting for the lever. The lever yoke 60 is of such contour and dimensions as to afford adequate clearance for the right-hand cam 68'. An operating roller 63, preferably of the ball bearing type, bears against the surface of cam 68', being supported as by a pin 64 extending through the top of the yoke and secured by a nut 65. An adjustable link, comprising an eye bolt 76 and clevis nut 77, connects the roller lever 46 and operating lever 15.

The left hand roller lever 56 is of similar construction and is similarly mounted and is provided with an operating roller 66. The operating lever 36 and roller lever 56 are adjustably connected in the same manner as levers 15 and 46 by an eye bolt 67 and clevis nut 68.

Figure 5:
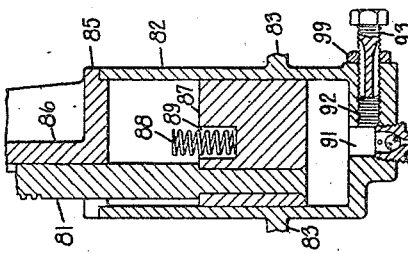
Figure 5 is an enlarged sectional view, taken along the line 5—5 of Figure 3, of the dash-pot mechanism.

The pinion 73 serves as part of the mechanism which may be employed to regulate the braking action. This mechanism is in the form of a dash-pot provided with a rack 81 by means of which operative connection with the pinion 73 is obtained. Referring also to Figure 5, the cylinder 82 of the dash-pot is formed with lugs 83. The dash-pot is mounted on the motor base 44 as by screws 84 passing through these lugs. The cover 85 for the cylinder is formed with a guide 86 for the rack 81. The dash-pot piston 87 is secured to the lower end of the rack, as in the manner illustrated. A buffer spring 88 is supported in a recess 89 formed in the top of the piston. A ball check valve 90 is provided in the bottom of the cylinder. A passage 91 connects this valve with the inside of the cylinder. A horizontal threaded passage 92, formed in a boss on the bottom of the cylinder, extends from passage 91 to the outside of the cylinder. A longitudinally slotted screw 93 is provided for regulating the flow of air into and out of the cylinder through the passage 92. A nut 99 serves to lock the regulating screw in its adjusted position.

Referring particularly to Figures 1 and 2, in order that the brake shoes may be maintained substantially concentric with the drum 94 when the brake is released, thus preventing the dragging of any part of the brake shoes, an adjustable abutment is provided on each operating lever above its pivot point and resilient means is provided below each pivot point for holding the brake shoe in engagement with its respective abutment. Thus, in the case of brake shoe 23 for example, a lug 95, formed on the lever 15 and extending downwardly between the sides 20 and 21, is threaded to receive abutment screw 96. A nut 97 is provided for locking screw 96 in adjusted position. The central portion of the connecting yoke 22 at the lower end of the lever is enlarged to form a boss. This boss is provided with a threaded aperture for receiving an adjusting screw 98 for the spring 100. A nut 101 is provided for locking the screw 98 in adjusted position. Spring 100 extends between a spring seat 102 formed on the inner end of screw 98 and a spring seat 103 formed on the brake shoe. The compression of the spring 100 is so adjusted as to maintain the boss 104 on the brake shoe in abutting relation with screw 96 when the brake is released. This portion of the apparatus is the same for brake shoe 35 and will not be described.

An adjustable abutment screw 105 is provided on operating lever 15 for engagement with a stop 106 formed on the frame web 13. A nut 107 is provided for locking the screw in its adjusted position. An additional abutment screw 108 is similarly provided on operating lever 36 for engagement with the stop 110.

In operation, the motor 43, upon energization, causes the rotation of cams 48 and 68, the direction of rotation being counter-clockwise as viewed in Figure 2. Cam 68 acts through roller 63 to move roller lever 46 inwardly about its pivot 61. The roller lever acts through clevis nut 77 and eye bolt 76 to move operating lever 15 about its pivot 16 to release brake shoe 23 from drum 94 against the force of the actuator spring 30. Brake shoe 35 is released by the action of cam 48, roller lever 56 and operating lever 36. Pinion 73, rotated along with cams 48 and 68, acts through rack 81 to lift the dash-pot piston 87. As the piston nears the top of the cylinder, buffer spring 88 engages the cylinder cover to damp the movement. Upon the engagement of the top of piston 87 with the cover, the motor is brought to a stop. As the motor remains energized however, the braking mechanism is maintained in released position.

Upon the deenergization of motor 43, piston 87, which is of considerable mass, is free to return to the bottom of the cylinder. The piston now drops under the influence of gravity, being aided in its initial movement by the action of spring 88 which exists in a state of compression up to the point of its disengagement from the cylinder cover. As a result of the downward movement of the piston, rack 81 rotates pinion 73, and therefore the motor shaft and cams, in the reverse direction. This reverse movement permits the actuator springs 30 and 38 to apply the brake shoes to the drum, the springs acting through the operating levers, links and roller levers to maintain the rollers 63 and 66 against the cammed surfaces of their respective cams. Due to the slope of the cams, the actuator springs, acting through the operating levers, links, roller levers, rollers and cams, aid the dash-pot piston in returning the motor to its original position. By employing cams of proper slope and levers proportioned accordingly, the return of the motor may be accomplished entirely by the force of the actuator springs.

The time required to apply the brake shoes to the drum may be adjusted to suit the requirements of the particular installation by means of the regulating screw 93. By turning this screw so as to cause it to move inwardly in the passage 92, the speed at which the piston 87 may move downwardly in the dash-pot cylinder is reduced. Conversely, by turning this screw so as to cause its outward movement in passage 92, the speed at which the piston may move downwardly is increased. The desired time for the releasing operation may be obtained by employing a ball check valve 90 of proper size.

According to the preferred arrangement, the dash-pot piston is still some distance from the bottom of the cylinder after the brake shoes are applied to the drum. The mechanism is illustrated with the parts in this position. The downward movement of the dash-pot piston, however, is uninterrupted by the application of the brake shoes, the movement being continued until the piston engages the bottom of the dash-pot cylinder. This engagement brings the motor to a stop, completing the return of the parts of the braking mechanism to their original position. The cams 48 and 68′ are designed so that they recede from contact with the rollers on the roller levers as the piston moves from brake applied position to the bottom of the cylinder. In this manner, allowance is made for the reasonable wear of the brake shoes, thereby preventing the shoes being held off the drum by the cams when such wear has occurred.

The initial adjustment for proper clearance between the drum 94 and the brake shoes when released is obtained by means of the links comprising eye bolt 67 and clevis nut 68 for shoe 35 and eye bolt 76 and clevis nut 77 for shoe 23. These links may also be employed for adjusting for clearance once the wear of the brake shoes has become so great as no longer to permit proper application of the brake.

The motor shaft 47 is preferably mounted for axial freedom as by dimensioning the bearing housings for the motor shaft bearings so as to permit considerable movement of the shaft and bearings to each side of central position, i. e., the position with the rotor of the motor central with respect to the stator. Thus, as regards bearing 51 for example, considerable axial clearance is provided between the bearing and the bearing cover 111 and also between the bearing and the bearing housing hub 112. Axial clearance is provided for bearing 71 in a similar manner. These bearings have a sliding fit in their respective housings. This arrangement acts automatically to insure release and application of both brake shoes under operating conditions without strain on the bearings and the motor framework and mounting. In order that this may be clearly understood, assume first that only slight normal axial clearance is provided for bearings 51 and 71 in their respective housings and that the wear of one of the brake shoe linings has been greater than the wear of the other or that improper adjustment has been made so as to cause one of the cams to engage its respective roller before the other cam engages its roller during the brake releasing operation. For convenience of more specific explanation, assume that the lining of brake shoe 35 has worn to a greater extent than that of brake shoe 23 and therefore that roller lever 56 extends outwardly more than roller lever 46. This results in cam 48 engaging roller 66 before cam 68′ engages roller 63 in the brake releasing operation. As a result, for a lack of adequate axial clearance for the bearings, the motor, upon its continued rotation, would have to exert sufficient side thrust on the bearings to the left (as viewed in Figures 1 and 3) to effect the release of brake shoe 35 against the force of actuator spring 38. As this side thrust would be transmitted to the bearing housing hub for bearing 71 and cover for bearing 51 and the motor frame and mounting, it will be seen that damage to these parts might result. Furthermore, the releasing operation for brake shoe 23 would not be initiated until cam 68 engaged roller 63 as a result of the continued rotation of the motor. Similarly, drum ahead of the other during the brake applying operation, a side thrust would be exerted on the bearings, the bearing housing hub for one bearing and cover for the other and the motor frame and mounting by the actuator spring for the other brake shoe. That is, if brake shoe 23, for example, should engage the drum before brake shoe 35, upon the deenergization of the motor, actuator spring 38 would exert a powerful side thrust to the left on the bearings in applying brake shoe 35. As before, this side thrust would be transmitted to the bearing housing hub for bearing 71 and cover for bearing 51 and the motor frame and mounting.

With the axial clearance provided as set forth above, side thrusts, which might be caused in the above described manner, are eliminated. In order to illustrate the operation of the mechanism with the motor shaft mounted for axial freedom, assume that roller lever 56 extends outwardly more than roller lever 46. Thus, upon the energization of the motor to release the brake, cam 48 engages roller 66 before cam 68 engages roller 63. As a result, cam 48, as its cammed surface rides over roller 66, causes the motor shaft and bearings to be shifted to the left (as viewed in Figures 1 and 3) until cam 68 engages roller 63, bearings 51 and 71 sliding in their housings to permit this movement. With both cams in engagement with their respective rollers, their continued rotation causes the release of both brake shoes in the manner previously described. In the brake applying operation, should brake shoe 23 engage the drum before brake shoe 35, the roller lever 46 would be held stationary and, as the motor shaft continues to revolve, the cammed surface of cam 68 would tend to recede from roller 63. Actuator spring 38, however, in applying brake shoe 35, acts through levers 36 and 56 and cam 48 to maintain the cammed surface of cam 68 in engagement with roller 63. That is, the action of spring 38, with brake shoe 23 applied, is to shift the motor shaft and its bearings to the left. As a result of this shift, the speed with which brake shoe 35 is applied is increased, tending to cause both shoes to be applied more nearly at the same time. With both brake shoes applied, further rotative motion of the cams, due to the dash pot piston 87 not having reached its lower limit of movement, causes their cammed surfaces to recede from their respective rollers as previously described. It is to be understood that the motor shaft and bearings are shifted regardless of the cause of one cam engaging its roller before the other engages its roller during the releasing operation and regardless of the cause of one brake shoe engaging the brake drum before the other brake shoe in the applying operation.

The above described arrangement for obtaining axial freedom of the motor shaft, in conjunction with abutment screws 105 and 108 and their stops, also serves to insure the proper operation of the mechanism without strain on the bearings and the motor framework and mounting in the event of considerable unequal adjustment of the actuator springs. Again for convenience of explanation, assume that only slight normal axial clearance is provided for the bearings and in addition that abutment screws 105 and 108 are not provided and that screws 32 have been tightened to the extent of causing actuator spring 30 to exert more force against brake shoe 23 than actuator spring 38 exerts against brake shoe 35. As a result, upon the cams engaging their respective rollers during the releasing operation, the motor, upon its continued rotation would have to exert considerable side thrust on the bearings to the right (as viewed in Figures 1 and 3) to effect the release of brake shoe 23 against the force of actuator spring 30. As previously explained, such side thrust might result in damage to parts of the mechanism. With the motor shaft mounted for axial freedom and the abutment screws 105 and 108 and their stops provided, however, such side thrusts due to the unequal forces exerted by the actuator springs are eliminated. Assuming again that actuator spring 30 is adjusted to exert more force against brake shoe 23 than actuator spring 38 exerts against brake shoe 35, upon cam 68 engaging roller 63 during the releasing operation, shoe 23 is not disengaged from drum 64 but the motor shaft is shifted to the right (as viewed in Figures 1 and 3). Brake shoe 35, however, is released by the rotative motion of cam 48 and the shifting of the motor shaft to move roller lever 56. Upon brake shoe 35 moving a certain distance away from brake drum 94, screw 108 engages its stop 110. As a result, further movement of roller lever 56 about its pivot is prevented and the continued rotative motion of the cams acts to shift the motor shaft back toward its central position and to release brake shoe 23. If desired, screws 105 and 108 may be employed to serve as a final stop for the releasing operation with spring 88 acting as a buffer.

In the previous explanation relating to the elimination of side thrusts such as might be caused by the engagement of one cam and its respective roller before the engagement of the other cam and its roller during brake releasing operation, the abutment screws 105 and 108 were not considered. With these screws provided and the motor shaft not mounted for axial freedom, should the engagement of one roller and cam occur before the engagement of the other roller and cam, the engagement of abutment screw for the lever first operated and its stop might stall the motor. Not only would such operation be undesirable because of the damage which might result from the attendant side thrusts but also because it might leave the other brake shoe applied or only partially released. Assume again for convenience of more specific explanation that only slight normal axial clearance is provided for the motor shaft bearings and that cam 48 engages roller 66 before cam 68 engages roller 63 in the brake releasing operation. As before, for lack of adequate clearance, the motor would have to exert sufficient side thrust on the bearings to the left to effect the release of brake shoe 35 against the force of actuator spring 38. Upon the engagement of abutment screw 108 and its stop, however, the motor would be stalled, thus increasing the side thrust, with greater possibility of damage. Obviously, in case of extremely poor adjustment of the mechanism, the stalling of the motor might occur before the engagement of cam 68 and roller 63 or before such engagement had effected the complete removal of brake shoe 23 from the drum. With the axial clearance provided, however, as previously described, the engagement of cam 48 and roller 66 shifts the motor shaft to the left until cam 68 engages roller 63 whereupon both brake shoes are released.

It is to be noted from the preceding description that the force exerted to effect the movement of each brake shoe with respect to the drum is counterbalanced by the force exerted to effect the movement of the other. This is true under all operating conditions regardless of the adjustment of the shoes or the wear on their linings. Although the motor is illustrated with only the rotating parts mounted for axial freedom, it is to be understood that it may be arranged so that it is free to move longitudinally as a whole.

The torque motor is preferably of the alternating current, induction motor type, wound for slow speed to produce high torque per ampere and designed so that a large percentage of the losses is concentrated in the end rings 115. These rings are brazed to the rotor bars 116 and are located outside the stator windings 117 as indicated in Figure 3. With such construction, the heat generated in the end rings is not effective to unduly heat the stator windings.

The motor, being inherently quiet in operation, aids in minimizing the possibility of noisy operation of the mechanism. The use of ball bearings for the motor shaft and operating rollers not only aids in obtaining quiet operation, but also reduces friction and wear. The use of the buffer spring 88 to damp the movement of piston 87 at the end of its upward stroke and the ball check valve to damp its downward movement also aids in rendering the braking mechanism quiet and smooth in operation.

As many changes could be made in the above construction and many apparently widely different embodiments of this invention could be made without departing from the scope thereof, it is intended that all matter contained in the above description or shown in the accompanying drawings shall be interpreted as illustrative and not in a limiting sense.

What is claimed is:

1. In combination; a rotatable drum; a friction shoe for cooperating with said drum; yielding means tending to maintain said shoe in gripping relation with said drum; a lever for releasing said shoe from said drum; a motor having a rotatable shaft; a cam mounted on said shaft; a second lever moved by said cam upon the rotative motion of said shaft; and means for transmitting said movement of the second lever to the first lever to release said shoe from said drum against the force of said yielding means.

2. In combination; a rotatable drum; a pair of friction shoes for cooperating with said drum; an operating member for each shoe; a cam for each operating member, said cams, upon rotative motion, causing the operation of their respective members to move said shoes with respect to said drum; and a motor, interposed between said operating members, for causing rotative motion of said cams, said motor having a shaft upon which said cams are mounted.

3. In combination; a rotatable drum; a pair of friction shoes for cooperating with said drum; an operating lever for each shoe; a pair of oppositely sloped cams, one for each operating lever, for causing, during rotative motion, opposite movement of their respective levers to move said shoes with respect to said drum; and a motor interposed between said operating levers for causing said rotative motion of said cams, said motor having a shaft upon which said cams are mounted.

4. In combination; a rotatable drum; a pair of levers; a pivotal support for each lever; a friction shoe carried by each lever at one end thereof for cooperation with said drum; yielding means tending to maintain said shoes in engagement with said drum; an additional pair of levers; one for each of said first named levers; a pivotal support for each additional lever; an adjustable link for connecting each additional lever with its corresponding first named lever; a cam for each additional lever for causing, during its rotative motion, pivotal movement thereof and therefore pivotal movement of the corresponding first named lever to release the shoe carried thereby from the drum against the force of said yielding means; and a motor for imparting rotative motion to said cams, said motor having a shaft upon one end of which one of said cams is mounted and upon the other end of which the other of said cams is mounted.

5. In combination; a rotatable drum; a friction shoe for cooperating with said drum; a lever for releasing said shoe from said drum; a cam having two limiting positions of rotative motion; a second lever disengaged from said cam in one limiting position thereof; a motor for rotating said cam from one limiting position to the other to cause it to engage said second lever during its rotative motion and thereafter move said second lever until the other limiting position is reached; and means for transmitting said movement of the second lever to the first lever to release said shoe from the drum.

6. In combination; a rotatable drum; a pair of pivoted levers; a friction shoe supported by each lever for cooperation with said drum; an additional pair of pivoted levers, one for each of said first named levers; a cam for each additional lever, said cams having two limiting positions of rotative motion and their camming surfaces being spaced from their respective additional levers in one of said limiting positions; a motor for rotating said cams from one limiting position to the other, the camming surfaces of said cams engaging their respective additional levers during the rotative motion to cause pivotal movement thereof; and a pair of adjustable links, one for connecting each additional lever with its respective first named lever, for transmitting said movement of said additional levers to said first named levers to release said shoes from said drum and for adjusting the space between said levers and the camming surfaces of their respective cams in said one limiting position.

7. In combination; a rotatable drum; a pair of levers; a pivotal support for each lever; a friction shoe carried by each lever, at one end thereof, for cooperation with said drum; an actuator spring for each shoe tending to maintain the shoe in engagement with said drum; an additional pair of levers, one for each of said first named levers; a pivotal support for each additional lever; a roller carried by each additional lever; a motor having a shaft; oppositely sloped cams, secured one to each end of said shaft, for engaging said rollers, during the energization of said motor to cause its rotative motion, to cause the pivotal movement of said additional levers; and adjustable links, one for connecting each additional lever with its corresponding first named lever, to transmit said movement of said additional levers to the first named levers to cause their pivotal movement to release said shoes from said drum against the force of said actuator springs, said links being adjusted so as to space said rollers from said cams with the motor in deenergized position.

8. In combination; a rotatable drum; a pair of friction shoes for cooperating with said drum; means, having two limiting positions of movement, for causing, during movement from one of said positions to the other, the release of said shoes from said drum; and means for retarding the movement of the first named means, said last named means comprising means for determining said limiting positions.

9. In combination; a rotatable drum; a pair of levers; a friction shoe carried by each lever; means operable from one limiting position to another to cause the movement of said levers to release said shoes from said drum; and dash-pot mechanism for retarding the operation of the first named means and for determining said limiting positions.

10. In combination: a rotatable drum; a pair of levers; a friction shoe carried by each lever; rotative means operable upon rotative movement from one limiting position to another to cause the movement of said levers to release said shoes from said drum; and dash-pot mechanism for retarding the operation of the first named means and for determining said limiting positions.

11. In combination; a rotatable drum; a pair of pivoted levers; a friction shoe carried by each lever for cooperation with said drum; means for pivotally moving each lever to cause the release of said shoes from said drum, said means comprising a cam for each lever for causing, during rotative motion from one limiting position to another, pivotal movement thereof and a motor for imparting rotative motion to said cams; and dash-pot mechanism for retarding the operation of the first named means and for determining the limiting positions of said cams.

12. In combination; a rotatable drum; a pair of friction shoes for cooperating with said drum; yielding means tending to maintain said shoes in engagement with said drum; rotative means operable upon rotative movement in one direction to cause the release of said shoes from said drum; and means for retarding the movement of said rotative means during the releasing operation and for causing reverse rotative movement of said rotative means to permit the application of said shoes to said drum by said yielding means.

13. In combination; a rotatable drum; a pair of friction shoes for cooperating with said drum; an operating lever for each shoe; yielding means tending to maintain said shoes in engagement with said drum; rotative means operable upon rotative motion in one direction to cause the operation of said levers to release said shoes from said drum against the force of said yielding means, said yielding means causing the application of said shoes to said drum upon reverse rotative motion of the second named means; and mechanism for retarding the movement of said shoes both during the releasing and applying operations and for causing the reverse rotative motion of the second named means.

14. In combination; a rotatable drum; a pair of friction shoes for cooperating with said drum; an actuator spring for each shoe; a lever for each shoe for causing, upon its pivotal movement, the release of its shoe from said drum against the force of the respective actuator spring; means operable, upon rotative motion in a certain direction, to cause said pivotal movement of said levers; a motor operable, upon energization, to impart rotative motion to the first named means in said certain direction; and dash-pot mechanism for causing said rotative motion in said certain direction to occur at one predetermined speed, and for causing, upon deenergization of said motor, reverse rotative motion of said first named means, at another predetermined speed, to permit said actuator springs to apply said shoes to said drum.

15. In combination; a rotatable drum; a pair of friction shoes for cooperating with said drum; means, having two limiting positions of movement, for causing, during movement from one of said positions to the other, the release of said shoes from said drum; and means for determining said limiting positions, for moving said first named means back from said other position to said one position and for retarding the movement of said first named means between its limiting positions.

16. Braking mechanism comprising; a brake drum; a pair of brake operating levers; a pivotal support for each lever, a brake shoe supported by each lever for cooperation with said drum; an actuator spring for each shoe; an additional pair of pivoted levers, one for each of said first named levers; an adjustable link for connecting each additional lever with its respective first named lever; a cam for each additional lever, said cams having two limiting positions of rotative motion and their camming surfaces being spaced from their respective additional levers in one of said limiting positions; a motor for imparting rotative motion to said cams from said one limiting position to the other, the camming surfaces of the cams engaging their respective additional levers during said rotative motion to cause pivotal movement thereof to release said shoes from said drum against the force of said actuator springs; and dash-pot mechanism for determining said limiting positions of said cams, for determining the rotative speed at which said motor moves the cams from said one limiting position to the other and for causing rotative motion of said motor, upon its deenergization, and cams back from said other to said one limiting position, at a speed different from the speed of rotative motion from said one to said other limiting position, to permit said actuator springs to apply said shoes to the drum.

In testimony whereof, I have signed my name to this specification.

BENJAMIN N. JONES.